United States Patent [19]
Nakajima

[11] 3,938,014
[45] Feb. 10, 1976

[54] BRUSHLESS D-C MOTOR
[75] Inventor: Toshitaka Nakajima, Matsumoto, Japan
[73] Assignee: Fuji Electric Co., Ltd., Kawasaki, Japan
[22] Filed: Feb. 14, 1974
[21] Appl. No.: 442,681

[30] Foreign Application Priority Data
Feb. 16, 1973  Japan................ 48-19065

[52] U.S. Cl................. 318/138; 318/254
[51] Int. Cl.²........................ H02K 29/00
[58] Field of Search........... 318/138, 254, 685, 696

[56] References Cited
UNITED STATES PATENTS

| | | | |
|---|---|---|---|
| 3,577,176 | 5/1971 | Kreithen | 318/432 |
| 3,750,000 | 6/1973 | Bruckner et al. | 318/696 |
| 3,767,896 | 10/1973 | Wada | 318/138 |
| 3,831,071 | 8/1974 | Mitsui | 318/254 |

*Primary Examiner*—Robert K. Schaefer
*Assistant Examiner*—John W. Redman
*Attorney, Agent, or Firm*—Kenyon & Kenyon Reilly Carr & Chapin

[57] ABSTRACT

A brushless d-c motor of the type having a permanent magnet rotor and a plurality of stator windings which are energized from a common d-c power source through transistors in response to means which detect the rotating position of the rotor in a manner such that the conductance of the transistors are so controlled as to ensure proper rotation, in which, means are provided for detecting the currents flowing through the stator windings and the outputs of these means used to control the transistors supplying current to the stators such as to equalize the current flow from stator winding to stator winding, thereby permitting transistors having unmatched gains to be used in the motor.

8 Claims, 4 Drawing Figures

BRUSHLESS D-C MOTOR

BACKGROUND OF THE INVENTION

This invention relates to permanent rotor brushless d-c motors which are energized from a d-c source using commutation transistors controlled by means sensing the angular position of the rotor in general, and more particularly to an improved circuit arrangement for use with such a motor which permits using unmatched commutation transistors.

It is well known that due to manufacturing tolerances, transistors of a given type will have very different current gain from one transistor to the other. When such transistors are used in a brushless d-c motor of the type described above, different currents can be caused to flow in the different stator windings. As a result, the torque of the motor will fluctuate. In order to avoid such variations in motor torque, it is necessary to use commutation transistors which have, to the greatest degree possible, equal current gains. Typically, such has been done by selecting transistors from a large number to obtain transistors which are matched in current gain. Obviously, this method requires a great deal of time and is quite expensive, thereby greatly increasing the manufacturing cost of such motors. Those skilled in the art will recognize that the cost of matched sets of transistors greatly exceeds the cost of the same transistor by itself.

Thus, it can be seen that there is a need for a brushless motor in which unmatched transistors can be used, thereby avoiding the process of transistor selection or the higher cost of buying prematched transistors, and which motor using unmatched transistors is still able to operate without the undesirable variations in motor torque.

SUMMARY OF THE INVENTION

The present invention provides a circuit arrangement for solving this problem by including means to measure the magnitude of the current flowing through the individual stator windings using at least one resistor and using the value so obtained to control the commutation transistors in the individual stator windings, in such a manner that the current flowing through each of the stator windings is approximately the same. In the preferred embodiment, the resistors determining current flow through the stator windings are connected in the common lead of the stator windings and the voltage drop across the resistors is used for driving at least one additional transistor which in turn controls the respective commutation transistor assigned to the individual stator windings in such a manner so as to equalize currents.

DETAILED DESCRIPTION OF THE PREFERRED EMBODIMENT

Figure 1:
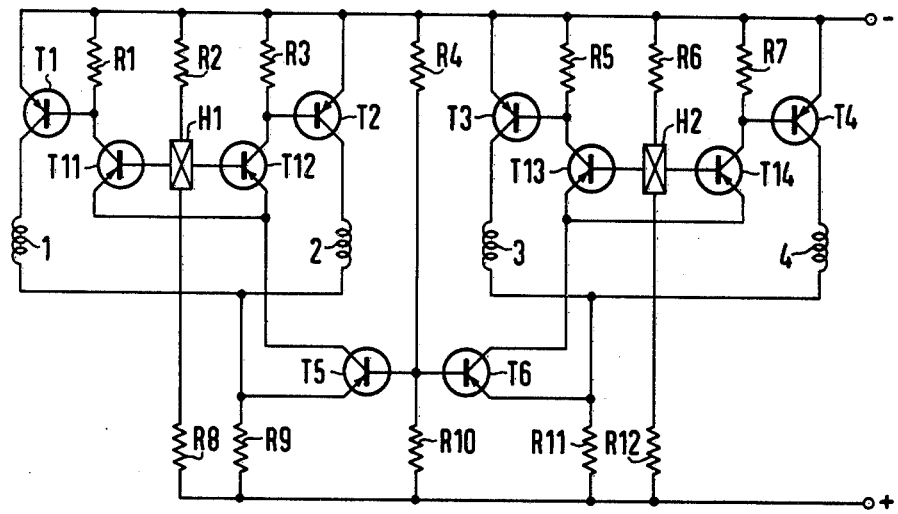
FIG. 1 is a schematic diagram of a first embodiment of the invention.

FIG. 1 illustrates a first embodiment of the present invention which includes a four winding stator with the stator windings designated 1, 2, 3 and 4. In conventional fashion, the stator windings will have a permanent magnet rotor associated therewith and rotating within the windings. The windings are arranged in the motor such that they are spaced at 90° increments. Also provided in conventional fashion are two Hall effect elements designated H1 and H2 which will be arranged displaced 90° from each other and will generate voltages in dependence on the rotor position. In well known fashion, a current will be caused to flow in each of the stator windings in dependence on the position of the rotor with the current flowing over an electrical angle of 180°, i.e., current will flow in each winding half of the time. The commutation transistors used to provide current to the stator windings are designated as T1, T2, T3 and T4 and have their collectors connected respectively to the stator windings 1, 2, 3 and 4, with each having its emitter coupled to the negative voltage. Also in the circuit are input transistors designated T11, T12, T13 and T14 which provide at their collector output the base input to the respective commutation transistors T1 through T4. As shown, the collectors of transistors T11 through T14 are connected to the negative voltage through resistors R1, R3, R5, and R7 respectively. The inputs to these transistors are from Hall effect generators H1 and H2, with Hall effect generator H1 providing the inputs to transistors T11 and T12 and Hall effect generator H2 the inputs to T13 and T14. One pair of these transistors is always acting as a differential amplifier for amplifying the output voltage of the Hall elements. In addition to the above described elements which are basically a conventional arrangement, two additional transistors T5 and T6 are provided. These are the transistors which are used to equalize the currents in the stator windings 1 through 4. As shown, these two transistors have their base coupled at the junction of a resistor divider made up of resistors R4 and R10. Also provided are resistors R2 and R6 coupling Hall effect generators H1 and H2 to the negative voltage and resistance R8 and R12 coupling the Hall effect generators to the positive voltage.

The windings 1 and 2 form a first pair and the windings 3 and 4 a second pair which are coupled together at their lower ends. The windings 1 and 2 are coupled to the positive voltage through a resistor R9, and the windings 3 and 4 through a resistor R11. The emitters of transistors T5 and T6 are coupled to the resistors R9 and R11 respectively. As noted above, the other ends of the stator wiindings are coupled through the collector emitters paths of the respective transistors T1 through T4 to the negative voltage. As also noted above, the bases of transistors T1 through T4 are coupled to the collectors of the transistors T11 through T14 with a pair of the latter always forming a differential amplifier. The bases of the one pair of transistors T11 and T12 are connected with the outputs of the Hall effect generator H1 and the bases of the other pair of transistors T13 and T14 to the two outputs of the other Hall effect generator H2. The emitters of transistors T11 and T12 are connected to the collectors of the one equalizing transistor T5 and the emitters of transistors T13 and T14 to the collector of the other equalizing transistor T6. As noted above, the collectors of transistors T11 through T14 are coupled to the negative voltage through the respective resistors R1, R3, R5 and R7.

Figure 2:
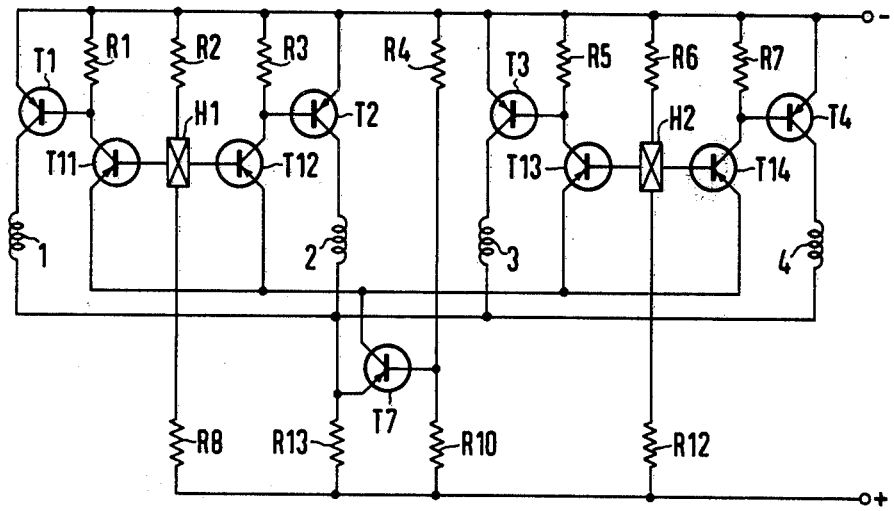
FIG. 2 is a schematic diagram of a second embodiment of the invention.
Figure 3:
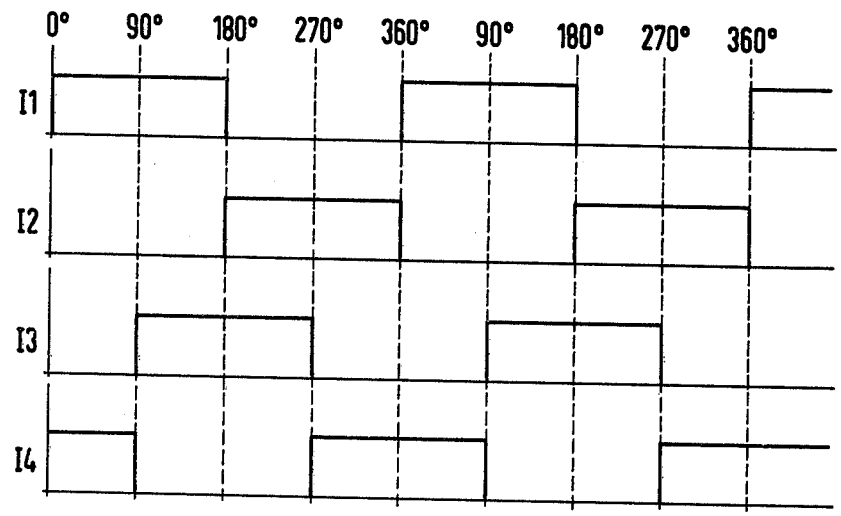
FIG. 3 is a waveform diagram illustrating operation of the embodiment of FIG. 1.

In the circuit of FIG. 2, the Hall effect generators H1 and H2 generate output voltages which are approximately sinusoidal and have a phase difference of 90° in accordance with the angular position of the rotor which is not specifically shown on the drawing. Without further measures and due to the different current gains, each pair of transistors T11 and T12 along with T13 and T14 would amplify the output voltages of the Hall effect generators H1 and H2 to a different degree. If the pair of transistors T11 and T12 which amplify the output voltages of the Hall effect generator H1 are considered, the transistor T11 will conduct for a period of 180° with the output of the Hall effect generator H1 positive, resulting in the transistor T1 going into a conducting state, causing a current to flow through stator winding 1. During the next 180° period, the transistor T12 conducts, at which point the Hall effect output is negative, resulting in the transistor T2 conducting and the transistor T1 being turned off. A current now flows in the stator winding 2. Transistors T13 and T14 which amplify the output voltages of the Hall effect generator H2 act in a similar manner, so that current flows alternatingly through the stator windings 3 and 4 for 180° period. Since the Hall effect generators H1 and H2 are displaced by 90°, the currents flowing through the stator windings 1 through 4 will have a phase difference of 90° with respect to each other as illustrated by FIG. 3.

On that figure, the currents flowing through the stator windings 1 through 4 are designated as I1 through I4. It will be seen therefrom that the electric currents flow through the stator windings for a period of 180° el in the sequence 1-3-2-4 with a phase displacement of 90° between individual currents to result in a torque being produced between the stator and rotor. If, however, the currents flowing through the stator windings are of different magnitude, the torque will vary.

Currents flowing through the stator windings go through the resistors R9 and R11. Because of this, it is possible to ascertain the magnitude of the current flowing through the stator windings through measurement of the voltage drop at the resistors 9 and 11. This voltage drop is applied to the emitters of T5 and T6 respectively, which have a base voltage which is kept constant through the voltage divider made up of resistors R4 and R10. In order words, the voltage drops across the resistors R9 and R11 are always sensed or monitored by the additional transistors T5 and T6. The emitter currents of the amplifier transistors T11 through T14 are then controlled by the collector currents of the additional equalizing transistors T5 and T6. These collector currents from the transistors T5 and T6 vary according to the difference between their emitter potential and their constant base potential.

Assume that the current gain of the transistor T1 is greater than that of the transistor T2 due to manufacturing tolerances. With no further steps taken, the current flowing through the stator winding 1 would be larger than the current which flows through the stator winding 2 by an amount corresponding to the difference of the current gains of the two transistors. This would normally result in unequal torques as described above. However, with the use of the resistors R9 and R11 and the transistors T5 and T6, this is avoided. The voltage drop at the resistor R9 will be larger during the time when the larger current is flowing, i.e., while current is flowing in the stator winding 1 under the above assumption. A lesser current and thus a lesser voltage drop will be experienced when current flows through the stator winding 2. As a result of this larger voltage drop, during the period when current is flowing through the stator winding 1, the potential at the emitter of transistor T5 will become relatively lower. As a result of this, the base current of transistor T1 is also reduced to result in a current flowing through the stator winding 1 which is in turn reduced to a predetermined value.

As shown on FIG. 3, during the next 180°, period current will flow in the stator winding 2, with transistor T2 conducting. Under the above assumptions, transistor T2 has a lower gain and thus, a smaller current will flow, resulting in a lower voltage drop across resistor R9. As a result, the emitter potential of transistor T5 is increased and along with it, transistor T5 collector current. This results in the base current of transistor T2 being increased and thereby causes an increase current flow through the stator winding 2. The other half of the circuit which is controlled by the Hall effect generator H2 functions in similar manner with the transistor T6 controlling the current flowing through the stator windings 3 and 4 to a value predetermined by the voltage divider are made of resistors R4 and R10.

Thus, from the above description, it can be seen that in accordance with the present invention, the current flowing through the stator windings 1 through 4 are ascertained at the resistors R9 and R11 and the voltages representative of these values so obtained used with equalizing transistors T5 and T6 to control the commutation transistors T1 through T4 through the amplifier transistors T11 through T16. As described above, the current ascertained at the resistors R9 and R11 are compared with a predetermined value determined by the voltage divider made up of resistors R4 and R10. In this manner the flow of current through the stator windings is equalized regardless of the deviations in the characteristics of transistors T1 through T4 so that variations of the motor torque caused by the inequality of stator currents can be essentially eliminated.

In the above described embodiment, the currents flow through the stator windings for a period of 180° el. For this reason, two transistors are required for equalizing the currents. In other embodiments such as that to be described below, the number of equalizing transistors can be reduced to 1. This is the case where currents flow through the stator windings only for 90° periods.

Figure 4:
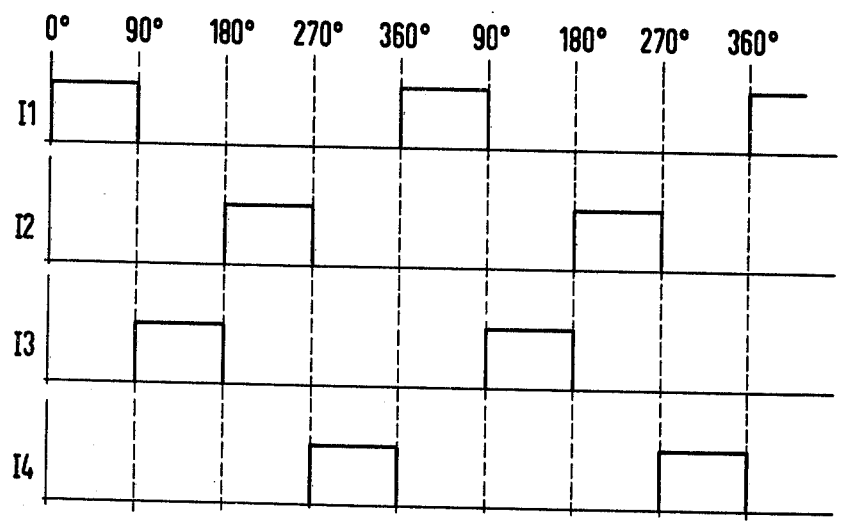
FIG. 4 is a similar diagram illustrating operation of the embodiment of FIG. 2.

FIG. 2 illustrates such a circuit with equivalent parts to FIG. 1 given identical reference numerals. In this embodiment, the emitters of the transistors T11 through T14 are all tied together. Similarly, the bottom ends of the stator windings 1 through 4 are also all tied together. Since the emitters of the four transistors T11 through T14 are all tied together, each of these transistors will conduct only if its base potential is lower than the base potentials of the other transistors. The base potentials of the transistors T11 through T14 vary sinusoidally as a function of the output voltage of the Hall effect generators. As a result, the period for which the base potential of a transistor is lower than the base potential of the other transistors is limited to 90° el. Thus, as illustrated by FIG. 4, each of the transistors T11 through T14 conducts for a period of only 90° as a function of the rotor position. The commutation transistors T1 through T4 are placed into conduction in synchronization with the transistors T11 through T14 with the currents shown on FIG. 4, i.e., I1 through I4 flowing through the stator windings, each for a period of 90°.

Since only one current at a time is flowing, all of the stator windings may be tied together and led to the positive voltage through a single sensing resistor R13. Thus, by measuring the voltage drop across R13, the currents through each of the stator windings 1 through 4 can be ascertained. Thus, in this embodiment, only a single additional transistor T7, having its emitter coupled to measure the potential at R13 and its base coupled to the voltage divider as above and supplying its collector current to all four emitters of transistors T11 through T14, is required. In the manner described above, the equalizing transistor T7 responds to the difference between the voltage drop across resistor R13 and its base voltage to control the amplifier transistors T11 through T14 and thus, in turn, the base inputs of the commutation transistors T1 through T4 to maintain the currents flowing through each of the stator windings 1 through 4 at a predetermined value.

Thus, it can be seen from the above description that in the embodiment of FIG. 2, the stator currents can be compensated and maintained equal through the use of a single transistor T7, even where the characteristics of the commutation transistors T1 through T4 are not matched. Through this embodiment, all currents flowing through the stator windings are maintained at the same magnitude and variations in motor torque will not occur.

The application of the present invention is not limited to a particular circuit arrangement nor specifically to a definite number of stator windings. If desired, the resistors R4 or R10 of the voltage divider can be replaced by variable resistors so that the magnitude of the currents which flow through the stator windings can be varied. In addition, the speed of the motor can furthermore be controlled by applying to the base of the equalizing transistors T5 and T6 or T7, an additional speed dependent voltage.

In accordance with the present invention, any inequalities in the stator currents are compensated automatically, regardless of deviations in the characteristics of the commutation transistors, thereby suppressing variations in motor torque. As noted above, this eliminates the process of selecting transistors to formed matched sets, thereby greatly reducing the cost of manufacturing a brushless d-c motor of this type.

Although specific embodiments have been illustrated and described, it will be obvious to those skilled in the art that various modifications may be made without departing from the spirit of the invention which is intended to be limited solely by the appended claims.

What is claimed is:

1. In a brushless d-c motor having a permanent magnet rotor and a plurality of stator windings with at least two of the stator windings having a lead in common and further including means to successively energize the stator windings using commutation transistors, in dependence of the angular position of the rotor, the improvement comprising:

a. a resistor coupling two stator windings in common to a voltage terminal to develop a voltage output representing the current flowing in the stator windings with which it is associated; and b. means having said voltage output as an input and providing an output coupled to control the commutation transistors associated with said two stator windings having a common lead so as to regulate the current flowing through said transistors to maintain currents of approximately equal magnitude flowing in each of the two stator windings having a common lead.

2. The improvement according to claim 1 wherein said means having the output of said resistor as an input comprise at least one additional transistor, coupled to and responsive to the voltage drop across said resistor and having an output coupled to control the commutation transistors associated with said stator windings having a common lead.

3. The improvement according to claim 2 wherein said commutation transistors are controlled in response to the collector output of respective input transistors and wherein said additional transistor has its emitter coupled to measure the voltage drop across said resistor and its collector coupled in the collector emitter path of said input transistors associated with the commutation transistors with the emitters of said input transistors tied together and coupled to the collector of said additional transistor and further including a voltage divider providing a constant voltage at the base of said additional transistor.

4. The improvement according to claim 3 wherein at least one of the resistors in said voltage divider is variable.

5. The improvement according to claim 2 and further including means for providing a voltage proportional to the desired speed of the rotor to the base of said additional transistor.

6. The improvement according to claim 2 wherein four stator windings are provided.

7. The improvement according to claim 6 wherein each of said stator windings have current flowing therethrough for 180 electrical degrees and wherein pairs of said stator windings have a common terminal point tied to a voltage terminal through respective first and second measuring resistors and wherein two additional transistors are provided coupled respectively to said first and second resistors and to the commutation transistors associated with the stator windings whose currennt said associated resistors are measuring.

8. The improvement according to claim 2 wherein each of said stator windings is conducting for only 90 electrical degrees and wherein all of said stator windings are tied together and coupled to a voltage terminal through a single sensing resistor and wherein a single additional transistor is provided coupled to said single resistor and to each of said commutation transistors.

* * * * *